United States Patent [19]

Suzuki et al.

[11] Patent Number: 5,553,278
[45] Date of Patent: Sep. 3, 1996

[54] METHOD AND SYSTEM FOR MANIPULATION OF DATABASE AND ISSUING REPORT THEREOF

[75] Inventors: Hiroyuki Suzuki, Hiratsuka; Yoichi Yokoyama, Ebina; Toshifumi Okamoto, Yokohama, all of Japan

[73] Assignees: Hitachi, Ltd., Tokyo; Hitachi Software Engineering Co., Yokohama, both of Japan

[21] Appl. No.: 121,739

[22] Filed: Sep. 15, 1993

[30] Foreign Application Priority Data

Sep. 21, 1992 [JP] Japan .................................. 4-250970

[51] Int. Cl.⁶ ...................................... G06F 17/30
[52] U.S. Cl. ...................... 395/600; 364/DIG. 1; 364/283.4
[58] Field of Search ............................ 395/600

[56] References Cited

U.S. PATENT DOCUMENTS 5,201,047  4/1993  Maki et al. .......................... 395/600
5,301,313  4/1995  Terada et al. ........................ 395/600
5,418,950  5/1995  Li et al. .............................. 395/600
5,428,737  6/1995  Li et al. .............................. 395/161

OTHER PUBLICATIONS

"Computer Aided Production Control System for Software," Hitachi Hyouron, vol. 62, No. 12, Dec. 1980, pp. 37–42 (Japanese).

Primary Examiner—Thomas G. Black
Assistant Examiner—John C. Loomis
Attorney, Agent, or Firm—Fay, Sharpe, Beall, Fagan, Minnich, & McKee

[57] ABSTRACT

Database manipulation, data processing and report output processing are supplied as software parts referred to as methods, respectively. In a procedure, the methods are arrayed in a sequence in which they are to be executed, and input/output files and conditions are defined for the methods, respectively. A control unit executes the methods in accordance with the conditions for thereby executing the procedure.

11 Claims, 13 Drawing Sheets

FIG.3

CONTENTS OF PROCEDURE P1

```
M 1   "EXECUTE"
      - "INPUT FILE"         = D B 1
      - "OUTPUT FILE"        = I F 1
      - "INPUT DICTIONARY"   = D I C T 1
      - "CONDITION FILE"     = C F 1
M 2   "EXECUTE"
      - "INPUT FILE"         = I F 1
      - "OUTPUT FILE"        = I F 2
      - "CONDITION FILE"     = C F 2
M 3   "EXECUTE"
      - "INPUT FILE"         = I F 2
      - "OUTPUT FILE"        = I F 3
      - "CONDITION FILE"     = C F 3
M 4   "EXECUTE"
      - "INPUT FILE"         = I F 3
      - "CONDITION FILE"     = C F 4
```

FIG.4

CONTENTS OF DICTIONARY DLCT 1

| ITEM | TYPE | LENGTH |
|---|---|---|
| SYSTEM NAME | CHARACTER | 8 DIGITS |
| PROGRAM NAME | CHARACTER | 8 DIGITS |
| BUG MANAGE No. | ALPHANUMERIC | 8 DIGITS |
| BUG PHENOMENA | CHARACTER | 80 DIGITS |
| BUG CAUSE/MEASURES | CHARACTER | 80 DIGITS |
| DATE OF BUG OCCURENCE | ALPHANUMERIC | 6 DIGITS |
| BUG FINDER | CHARACTER | 8 DIGITS |
| DATE OF DEBUGGING | ALPHANUMERIC | 6 DIGITS |
| DEBUGGING MODULE NAME | ALPHANUMERIC | 31 DIGITS |
| DEBUGGER | CHARACTER | 8 DIGITS |
| BUG INVOLVING PROCESS | CHARACTER | 2 DIGITS |
| BUG INVOLVING FACTOR | CHARACTER | 2 DIGITS |

FIG.5

CONTENTS OF DATABASE DB1

| | | | |
|---|---|---|---|
| CAPS | PROG1 | B001 ········ | 920310 ········ |
| CAPS | PROG1 | B002 ········ | 920401 ········ |
| CAPS | PROG1 | B003 ········ | 920401 ········ |
| CAPS | PROG1 | B004 ········ | 920402 ········ |
| CAPS | PROG2 | B001 ········ | 920404 ········ |
| SYS1 | PROG1 | B001 ········ | 920403 ········ |
| SYS2 | PROG1 | B001 ········ | 920405 ········ |

FIG.6

CONTENTS OF CONDITION FILE CF1

"INPUT CONDITION": COLUMN 1 = "CAPS"

FIG. 7

CONTENTS OF INTERMEDIATE FILE IF1

[ FORMAT AREA ]
COLUMN 1 : "SYSTEM NAME ", "CHARACTER TYPE", "8 DIGITS"
COLUMN 2 : "PROGRAM ", "CHARACTER TYPE ", "8 DIGITS"
COLUMN 3 : "BUG MANAGE No.", "ALPHANUMERIC TYPE"", "8 DIGITS"
COLUMN 4 : "BUG PHENOMENA", "CHARACTER TYPE ", "80 DIGITS"
COLUMN 5 : "BUG CAUSE/MEASURES ", "CHARACTER TYPE", "80 DIGITS"
COLUMN 6 : "DATE OF BUG OCCURRENCE", "ALPHANUMERIC TYPE", "6 DIGITS"
COLUMN 7 : "BUG FINDER ", "CHARACTER TYPE ", "8 DIGITS "
COLUMN 8 : "DATE OF DEBUGGING ", "ALPHANUMERIC TYPE", "6 DIGITS "
COLUMN 9 : "DEBUGGING MODULE NAME","ALPHANUMERIC TYPE","31 DIGITS"
COLUMN 10 : "DEBUGGER ", "CHARACTER TYPE ", "8 DIGITS "
COLUMN 11 : "BUG INVOLVING PROCESS ", "CHARACTER TYPE ", "2 DIGITS "
COLUMN 12 : "BUG INVOLVING FACTOR ", "CHARACTER TYPE ", "2 DIGITS "

[ DATA AREA ]
```
CAPS    PROG1    B001 ········ 920310 ········
CAPS    PROG1    B002 ········ 920401 ········
CAPS    PROG1    B003 ········ 920401 ········
CAPS    PROG1    B004 ········ 920402 ········
CAPS    PROG2    B001 ········ 920404 ········
```

FIG.8

CONTENTS OF CONDITION FILE CF2

"SELECT COLUMN" : COLUMN 2
"SELECT COLUMN" : COLUMN 8 ( > = 9820401 )

FIG.9

CONTENTS OF INTERMEDIATE FILE IF2

[ FORMAT AREA ]
COLUMN 2 : "PROGRAM NAME" , "CHARACTER TYPE", "8 DIGITS "
COLUMN 8 : "DATE OF DEBUGGING ", " ALPHANUMERIC TYPE","6 DIGITS "

[ DATA AREA ]
PROG1      920401
PROG1      920401
PROG1      920402
PROG2      920404

FIG.10

CONTENTS OF CONDITION FILE CF3

"SELECT GROUPING COLUMN ": "COLUMN 2"
"TOTALIZE GROUPWISE ": COLUMN 13 ,"NUMBER OF BUGS","INTEGER","4 DIGITS "

FIG.11

CONTENTS OF INTERMEDIATE FILE IF3

[ FORMAT AREA ]
COLUMN 2 : "PROGRAM NAME", "CHARACTER TYPE", "8 DIGITS"
COLUMN 13 : "NUMBER OF BUGS", "INTEGER TYPE", "4 DIGITS"

[ DATA AREA ]
PROG1     3
PROG2     1

FIG.12

CONTENS OF CONDITION FILE CF4

"TITLE OF TABLE" : "NUMBER OF BUGS IN CAPS ON / AFTER APRIL 4"
"DISPLAY COLUMN 1" : COLUMN 2
"DISPLAY COLUMN 2" : COLUMN 13

FIG.13

REPORT

NUMBER OF BUGS IN CAPS ON / AFTER APRIL 4

| PROGRAM NAME | NUMBER OF BUGS |
|---|---|
| PROG1 | 3 |
| PROG2 | 1 |

FIG. 14  LIST OF FUNCTIONS OF THE METHODS

| CODE | METHOD | FUNCTION |
|---|---|---|
| — | DATA PROCESSING METHOD | DATA MANIPULATING METHOD PREPARED BY DATA MANAGE COMPONENT |
| — | DEVICE ACCESS METHOD | MAKE ACCESS TO DATA ON DEVICE |
| A1 | DATA MANAGE INPUT METHOD | READ REAL DATA FROM HARD DISK AND CREATE FILE IN MAIN MEMORY |
| A2 | DATA MANAGE OUTPUT METHOD | STORE CONTENTS OF FILE ON MAIN MEMORY IN HARD DISK |
| — | DATA TRANSLATE METHOD | TRANSLATE & PROCESS INPUT DATA |
| C2 | SORT METHOD | SORT DATA FILE |
| C1 | MERGE METHOD | MERGE TWO DATA FILES |
| C3 | ARRANGE METHOD | CHANGE COLUMN ORDER OF INPUT DATA FILE |
| M2 | COLUMN SELECT METHOD | RETRIEVE DATA SATISFYING SEARCH QUERY FROM DATA FILES IN COLUMN |
| M1 | RECORD SELECT METHOD | RETRIEVE DATA SATISFYING SEARCH QUERY FROM DATA FILE IN ROW |
| D1 | DATA TRANSLATE METHOD | TRANSLATE DATA FORMAT |
| — | CALCULATION METHOD | CALCULATE ON THE BASIS OF DATA IN FILE |
| S1 | STATISTICAL METHOD | DETERMINE SUM, AVERAGE, MAXIMUM, MINIMUM, NUMBER OF ITEMS IN COLUMN |
| M3 | TOTALIZATION METHOD | CREATE TOTALIZATION COLUMN FOR COLUMNS OF DATA FILE |
| S2 | FUNCTIONAL OPERATION METHOD | PERFORM OPERATION ON DATA IN ONE OR MORE COLUMNS IN ACCORDANCE WITH DESIGNATED FUNCTION |
| S3 | GOMPERTZ METHOD | DETERMINE GOMPERTZ SEQUENCE COLUMNWISE IN DATA FILE |
| — | REPORT OUTPUT METHOD | OUTPUT DATA IN THE FROM OF TABLE, GRAPH, etc. |
| M4 | TABLE OUTPUT METHOD | OUTPUT TABLE |
| Q1 | BROKEN LINE GRAPH OUTPUT METHOD | OUTPUT BROKEN LINE GRAPH |
| Q2 | HISTOGRAM OUTPUT METHOD | OUTPUT HISTOGRAM |
| Q3 | CIRCLE GRAPH OUTPUT METHOD | OUTPUT CIRCLE GRAPH |

FIG. 17

CONTENTS OF PROCEDURE P2

M 1 "EXECUTE"
- "INPUT FILE" = D B 1
- "OUTPUT FILE" = I F 1
- "INPUT DICTIONARY" = D I C T 1
- "CONDITION FILE" = C F 1

M 6 "EXECUTE"
- "UPDATE CONDITION FILE" = C F 2

M 2 "EXECUTE"
- "INPUT FILE" = I F 1
- "OUTPUT FILE" = I F 2
- "CONDITION FILE" = C F 2

M 3 "EXECUTE"
- "INPUT FILE" = I F 2
- "OUTPUT FILE" = I F 3
- "CONDITION FILE" = C F 3

M 4 "EXECUTE"
- "INPUT FILE" = I F 3
- "CONDITION FILE" = C F 4

PROCEDURE FILE CREATING FLOW

METHOD AND SYSTEM FOR MANIPULATION OF DATABASE AND ISSUING REPORT THEREOF

BACKGROUND OF THE INVENTION

1. Field of the Invention

The present invention relates generally to a database. More particularly, the invention is concerned with a method of searching or retrieving data from a database, processing and outputting the data in the form of a report of a desired format and a system for carrying out the method.

2. Description of the Related Art

In the database manipulating system known heretofore in which data are retrieved from a database, processed and outputted in the form of reports, there are issued many types of reports, wherein report output programs are developed although it depends on the contents of the reports, as is discussed in Japanese literature "HITACHI HYOURON", Vol. 62, No. 12 (December, 1980), pages 37–42.

In conjunction with manipulation of the database, there has been developed a general-use oriented database manipulating language known as DML (Data Manipulate Language). However, the function of the DML is limited to the retrieval of data from the database, writing of data into the database and the like function. Consequently, in order to effectuate the statistical processing of the data as retrieved as well as generation or issuance of the report, it is required to develop programs to these ends.

In other words, when many types of reports are to be outputted in the conventional database manipulation system with the aid of the language known heretofore, burden is imposed onto the user or operator in that he or she has to learn a relevant programming language and develop many programs as required in order to make available many types of reports as the output of the database manipulation.

It is further noted that difficulty is encountered in the reuse of existing software portion even when data processing and report generation are to be effected in a manner differing only a little from that of the existing software.

SUMMARY OF THE INVENTION

It is therefore an object of the present invention to provide a database manipulation method and system which can ensure data processing and report generation in a simplified and facilitated manner without necessitating learning of any programming language and software development.

It is another object of the invention to provide a technique which can facilitate alteration or modification of the data form and the report output format.

It is still another object of the invention to provide a technique which allows software once developed to be reused without any appreciable difficulty.

The above and other objects which will become apparent as description proceeds can be achieved by representing a series of processings (or subprocessings) involved in the data processing and the generation of report by a group of software parts referred to as the data processing methods or simply as the methods while giving the conditions for the individual data processings (methods) in the form of condition files.

BRIEF DESCRIPTION OF THE DRAWINGS

FIG. 3 is a view for illustrating, by way of example, contents of a procedure file (PF) shown in FIG. 1;

FIG. 4 is a view for illustrating, by way of example, contents of a dictionary (DICT1) shown in FIG. 1;

FIG. 5 is a view for illustrating, by way of example, contents of a database (DB1) shown in FIG. 1;

FIG. 6 is a view for illustrating, by way of example, contents of a condition file (CF1) shown in FIG. 1;

FIG. 7 is a view for illustrating, by way of example, contents of an intermediate file (IF1) shown in FIG. 1;

FIG. 8 is a view for illustrating, by way of example, contents of a second condition file (CF2) shown in FIG. 1;

FIG. 9 is a view for illustrating, by way of example, contents of a second intermediate file (IF2) shown in FIG. 1;

FIG. 10 is a view for illustrating, by way of example, contents of a third condition file (CF3) shown in FIG. 1;

FIG. 11 is a view for illustrating, by way of example, contents of a third intermediate file (IF3) shown in FIG. 1;

FIG. 12 is a view for illustrating, by way of example, contents of a fourth condition file (CF4) shown in FIG. 1;

FIG. 13 is a view showing an example of display generated on a terminal display device (DISP1) shown in FIG. 1;

FIG. 14 is a view showing several exemplary ones of the methods proposed as software parts by the invention together with functions thereof in the database manipulation system shown in FIG.;1;

FIG. 17 is a view showing, by way of example, contents of a procedure file PF shown in FIG. 16;

DESCRIPTION OF THE PREFERRED EMBODIMENTS

Now, the present invention will be described in detail in conjunction with the preferred or exemplary embodiments thereof by reference to the drawings. In the following description, it is assumed that the invention is applied to generation of reports for controlling or managing software development, only for the illustrative purpose.

Figure 19:
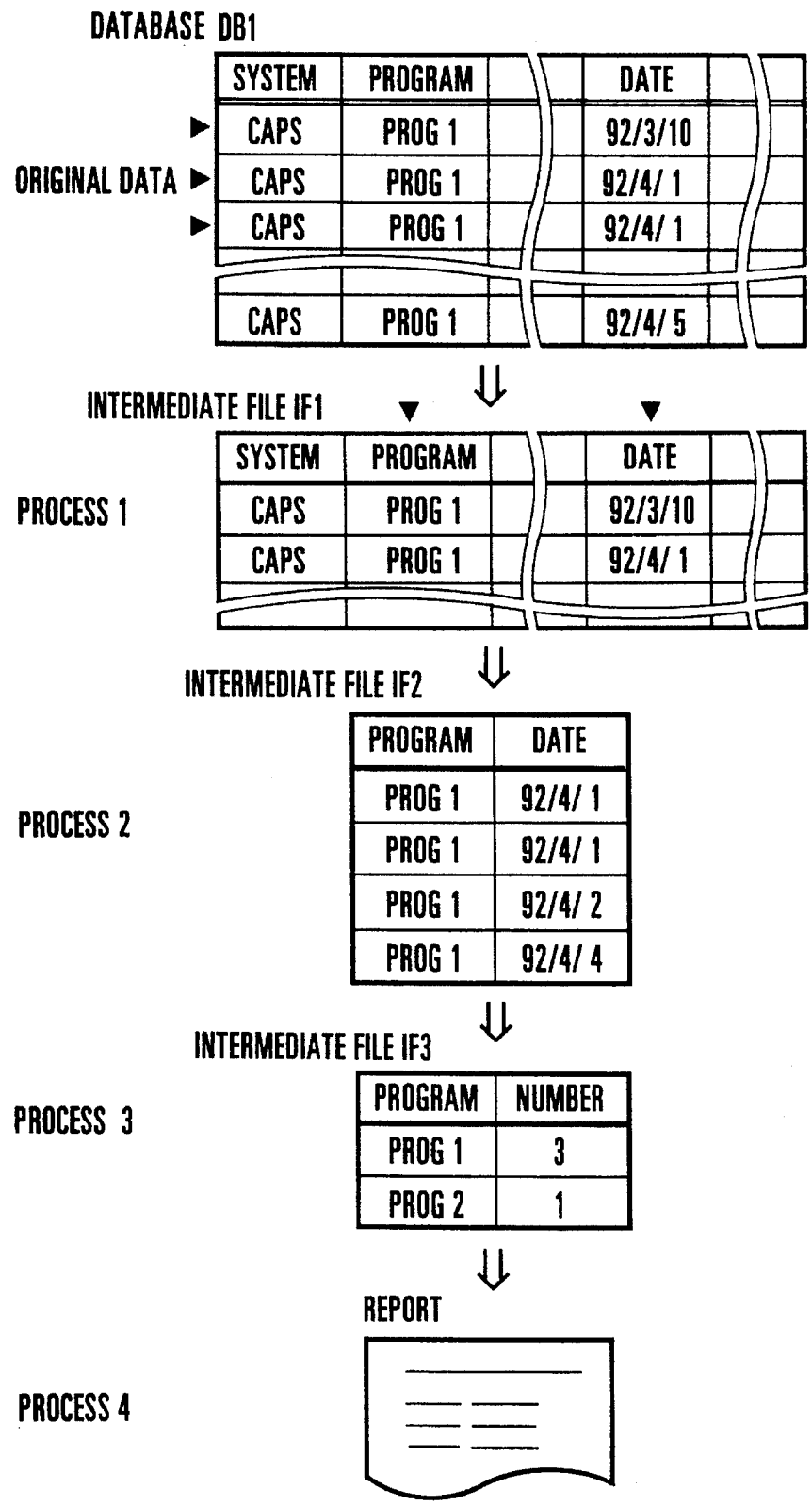
FIG. 19 is a view showing, by way of example, results of analysis of database manipulation and report output processing executed in a conventional manner.

FIG. 19 shows results of analysis of conventional processes for generating reports from a database in which data concerning defects or bugs occurred or found in the course of a software development are stored.

Referring to the figure, a database DB1 stores therein original data concerning each of defects or bugs in terms of a system identifier or name, a program name, date of occurrence and others.

For totalizing the data of bugs for a system having a system name "CAPS", only those records whose system name is "CAPS" are extracted from the original data, as shown in FIG. 19 at a step "PROCESS1". The data extracted in the step "PROCESS1" are placed in a first intermediate file IF1.

When the data concerning the bugs occurred on and after Apr. 1, 1992 are to be extracted from the intermediate file IF1 and totalized on a program-name basis, these data in a column labeled "DATE" which satisfy the condition mentioned above as well as the corresponding data in a column labeled "PROGRAM" are selected, as indicated in FIG. 19 at "PROCESS2". The data selected in the step "PROCESS2" are placed in the second intermediate file IF2.

The number of the data in the second intermediate file IF2 is totalized on the program-name basis (i.e., for each of the program names), and the results of the totalization are placed in a third intermediate file IF3 in a step "PROCESS3".

By outputting the results of totalization contained in the IF3 in the form of a table with an appropriate header or title affixed thereto in a step "PROCESS4", a report is generated or issued, as shown in FIG. 19 at "REPORT".

In this manner, the data manipulation/report generation processing for a database can be divided into plural types of subprocessings or processes.

In this conjunction, it should be noted that each of the steps or processes (subprocessings)"PROCESS1" to "PROCESS4" can be segregated into so-called "manipulation" and "condition". By way of example, the step "PROCESS1" can be segregated into the condition specifying that "the system name is CAPS" and the manipulation of "selecting the records", while the step "PROCESS4" can be divided into the condition stipulating that "title be affixed" and the manipulation of "outputting a report in the form of a table". Same applies valid to the other processes.

As can be understood from the above, the processing for the database DB1 can be divided into a plurality of subprocessings or processes, and each of the subprocessings or processes in turn can be segregated into the manipulation and the condition.

Figure 1:
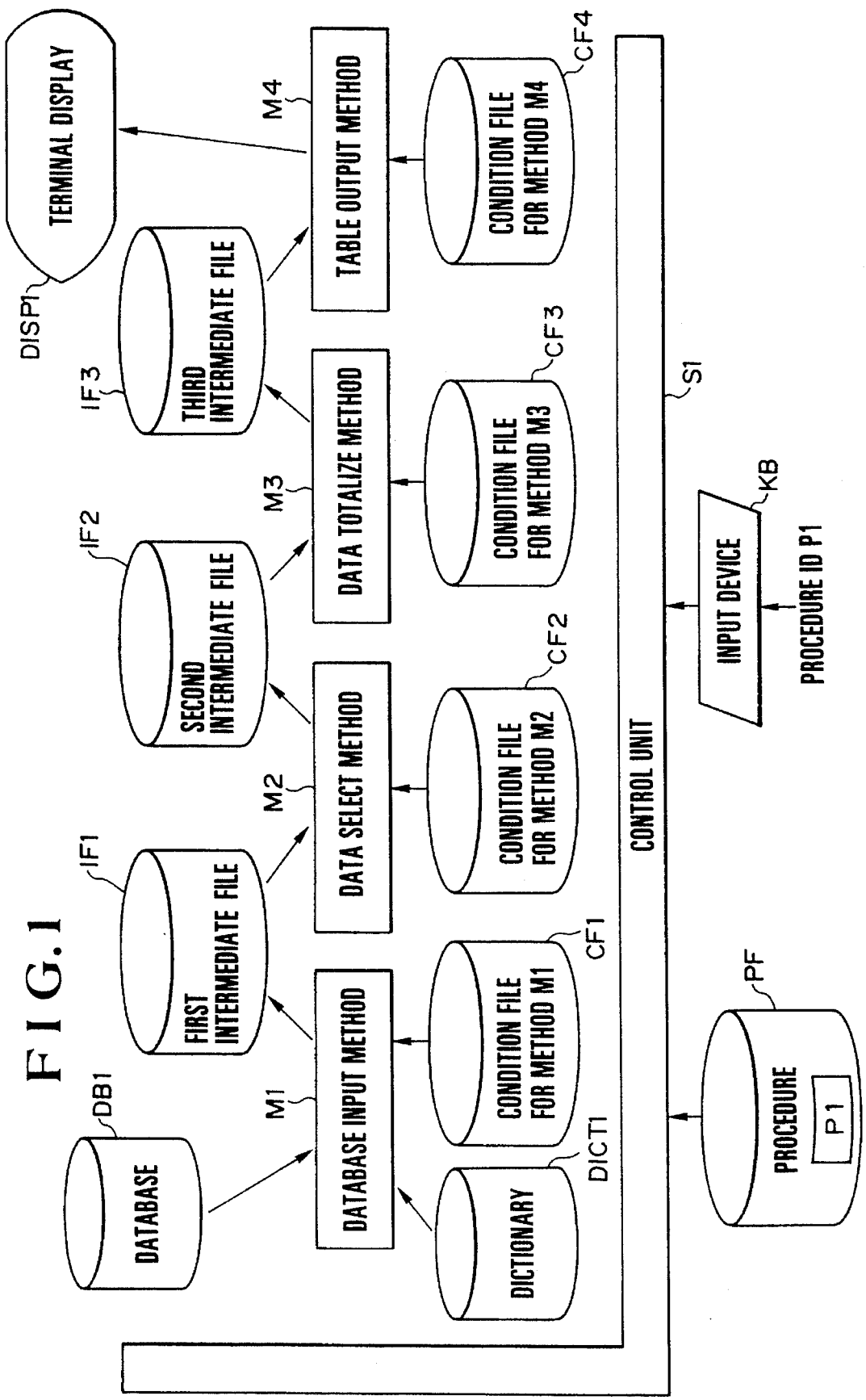
FIG. 1 is a schematic block diagram showing a general arrangement of a database manipulating/report issuing system according to an embodiment of the present invention.

FIG. 1 shows schematically a configuration of a database manipulating/report generating system implemented according to an embodiment of the invention for executing the processing illustrated in FIG. 19.

In FIG. 1, reference character DB1 denotes a database which stores original data, DICT1 denotes a dictionary in which defining item names, types and lengths of individual items in the database DB1 are stored, M1 to M4 denote methods for realizing the manipulations in the subprocessings "PROCESS1" to "PROCESS4" provided according to the invention, CF1 to CF4 denote condition files for storing the conditions for the subprocessings "PROCESS1" to "PROCESS4", i.e., the conditions corresponding to the methods M1 to M4, respectively, and IF1 to IF3 denote intermediate files corresponding to those designated by IF1 to IF3 in FIG. 19. Further, the report "REPORT" issued as the final result of the processing shown in FIG. 19 is generated on an output device DISP1 which may be constituted by a display device.

The database DB1, the dictionary DICT1 and the intermediate files IF1–IF3 mentioned above and a procedure file PF mentioned below can be secured on a hard disk in the form of files, respectively, while the methods M1–M4 can be realized in the form of software programs with a control unit S1 being realized by an interpreter.

The user defines relations between the above-mentioned files and the methods as well as a sequence or order in which the methods M1–M4 are executed as a procedure identification (ID) information P1 in the procedure file PF shown in FIG. 1. When the procedure ID information P1 is inputted to the control unit S1 through an input device KB which may be constituted by a keyboard, mouse or the like, the control unit S1 performs processing in accordance with the contents of the procedure ID information P1, whereby the processing shown in FIG. 19 is executed.

Figure 2:
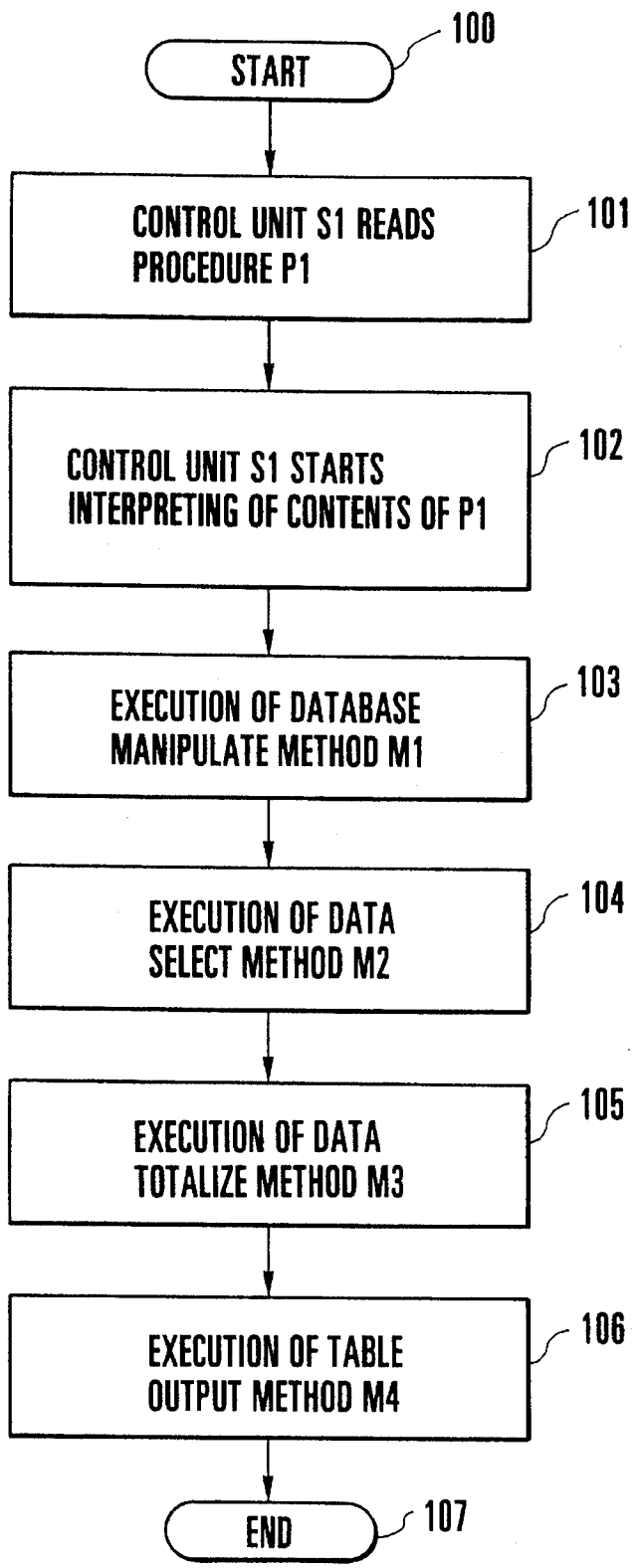
FIG. 2 is a flow chart for illustrating processings executed in the system according to an embodiment of the invention.

Now, a procedure for issuing or outputting a report of a software bug (defect) analysis will be described, only by way of example, by reference to a flow chart shown in FIG. 2.

Referring to the figure, the processing for generating a report of software bug analysis is started in a step 100.

In a next step 101, the user inputs to the control unit S1 with the aid of the input device KB the aforementioned procedure ID information P1 of the procedure file PF which stores procedures to be executed. On the basis of the procedure ID information P1 as inputted, the control unit S1 searches the corresponding procedure file PF and fetches the contents thereof. FIG. 3 shows, by way of example, contents of the procedure file PF designated by the procedure ID information P1 as inputted. In the figure, reference character M1 denotes the method for fetching the data from the database DB1, M2 denotes the method for selecting or extracting selectively the data in accordance with the condition as given, M3 denotes the method for totalizing the data in columns as designated, and M4 denotes the method for generating or issuing the data in the designated columns on a terminal display device DISP1. As can be seen in FIG. 3, for carrying out the method M1, the control unit S1 is supplied with messages indicating that the object for "execution" is the database DB1, "input file to be fetched or inputted" is resident in the database DB1, "output file (in which the result of the method M1 is to be stored)" is the intermediate file IF1, "dictionary to be inputted" is the dictionary DICT1 and that "condition file" to be referenced is the file CF1. In executing the methods M2, M3 and M4, similar messages are supplied to the control unit S1 shown in FIG. 1.

Subsequently, in a step 102 of FIG. 2, the control unit S1 starts execution of interpretation of the procedure ID information.

In a step 103, the method M1 is first executed in accordance with the procedure ID information P1 indicated at the topmost five rows in FIG. 3. In accordance with the messages inputted for the method M1, the control unit S1 fetches therein data from the database DB1 in the data format indicated by the dictionary DICT1 in accordance with the condition given by the condition file CF to thereby output the intermediate file IF1. FIG. 5 shows, by way of example, the contents of the dictionary DICT1. As mentioned previously, there are defined in the dictionary DICT1 the item names, types and lengths of the data on a record-by-record basis. As can be seen in FIG. 5, there exists a record having the item name "system name" which record is of character type and has a data length of eight digits. More specifically, FIG. 5 shows exemplary contents of the database DB1. The data on the first line shown in this figure indicate that the system name is "CAPS", the program name or ID (identifier) is "PROG1", the bug manage ID number is "B001" and that the date of debugging is "920310" representing "Mar.10, 1992". The condition file CF1 shown in FIG. 1 stores information of the condition to be applied to the method M1 and thus contains the condition for the methods M1. The range of the statement in the condition file CF1 depends on the processing capability or capacity of the method M1. FIG. 6 shows an example of the content of the condition file CF1. In the case of this example, it is indicated that the data of the first column, i.e., the data whose system name is "CAPS", is to be inputted. The method M1 can perform the processing in correspondence to the attributes of the types and the lengths because the information of the dictionary DICT1 is available. In other words, the method M1 can perform processings for various attributes so far as it has a correspondingly high processing capability. FIG. 7 shows an example of the contents of the intermediate file IF1, which contains two types of information, i.e., format information and data information. More specifically, the intermediate file IF1 has a format area for the format information in which there is stored information of attributes of the data stored in a data area. On the other hand, the data area is dedicated to storage of the information resulting from the processing performed by the method M1. More specifically, the attribute information of a first column in the data area indicates that the item name is "system name", the type is "character type" and that the length is "8 digits". In the data area, there are stored five data whose system name is "CAPS".

In a step 104, the method M2 is executed in accordance with the instructions stated on sixth to ninth lines of the procedure shown in FIG. 3. In response to the messages as given, the method M2 receives the intermediate file IF1, performs the processing on the contents of this file in accordance with the conditions indicated by the condition file CF2 and transfers the result of the processing to the second intermediate file IF2. FIG. 8 shows an example of the contents of the condition file CF2. As can be seen from the figure, the condition file CF2 indicates that data of the second column (i.e., program name) and data of the eighth column (i.e., data of debugging) are to be fetched and that the bug data after Apr. 1, 1992 inclusive be selected. FIG. 9 shows an example of content of the second intermediate file IF2. More specifically, the content of the first intermediate file IF1 is processed by the method M2 under the conditions specified by the content of the condition file CF2, wherein the results of the processing executed by the method M2 is placed in the second intermediate file IF2, as a result of which there are placed in the file IF2 the data of the second and eighth columns, i.e., data of the bugs debugged after Apr. 1, 1992 inclusive.

In a step 105, the method M3 is executed in accordance with the instructions stated on the tenth to thirteenth line of the procedure ID information P1 shown in FIG. 3. In response to the messages as given, the method M3 fetches the content of the second intermediate file IF2 shown in FIG. 1 and performs processing thereon on the conditions indicated in the condition file CF3, the result of the processing being transferred to the third intermediate file IF3. FIG. 10 shows an example of the content of the condition file CF3. As can be seen from this figure, the condition file CF3 indicates that the data be classified into groups in accordance with the data contained in the second column and a column be created for the data having the item name "number of bugs", the type "integer type" and the length "four digits", wherein the values in the column represent the number of the data groups resulting from the classification. FIG. 11 shows an example of the contents of the third intermediate file IF3. As can be seen, there are placed in this intermediate file IF3 data of the second column (i.e., group specifying column) and the data of a thirteenth column in which new data of sum for each group are contained. In the format area, there is placed the attribute information of the data of the second and thirteenth columns.

In a step 106, the method M4 is executed in accordance with the instructions on the fourteenth to sixteenth lines of the procedure ID information P1 shown in FIG. 3. In dependence on the messages as supplied, the method M4 fetches the contents of the third intermediate file IF3 shown in FIG. 1 to perform the processing on the data as fetched under the condition indicated by the condition file CF4, the result of the processing being then outputted to the terminal display DISP1 in the form of a table. In this case, the condition file CF4 indicates that the title of the table to be displayed is "number of bugs in CAPS on/after April 1", the content of the second column be displayed in a first column of the table and that the content of the thirteenth column be displayed in a second column of the table. FIG. 13 shows an example of the display generated on the terminal display DISP1. The attributes of the data required for the display can be obtained from the format area of the third intermediate file IF3.

In a step 107, the processing for outputting the report concerning the analysis of software bugs comes to an end.

As will now be appreciated from the foregoing, a series of the processings (or subprocessings to say move strictly) can be assembled from the methods as major parts and the condition files as accessary parts and can be realized easily by defining the input/output information relevant to the methods.

Several exemplary ones of the methods which are available as the parts from the system are illustrated in FIG. 14. In addition to the methods M1 to M4, there are prepared methods for data sort/merge, format translation, statistical processing, various report output processings, etc., for the corresponding subprocessings.

The conditions which can be described in the condition files may include in addition to the item name or designation and the numerical values mentioned above such conditions as logical conditions typified by "AND" or "OR" conditions between or among a plurality of the conditions mentioned above as well as conditions given by mathematic formulae.

Figure 15:
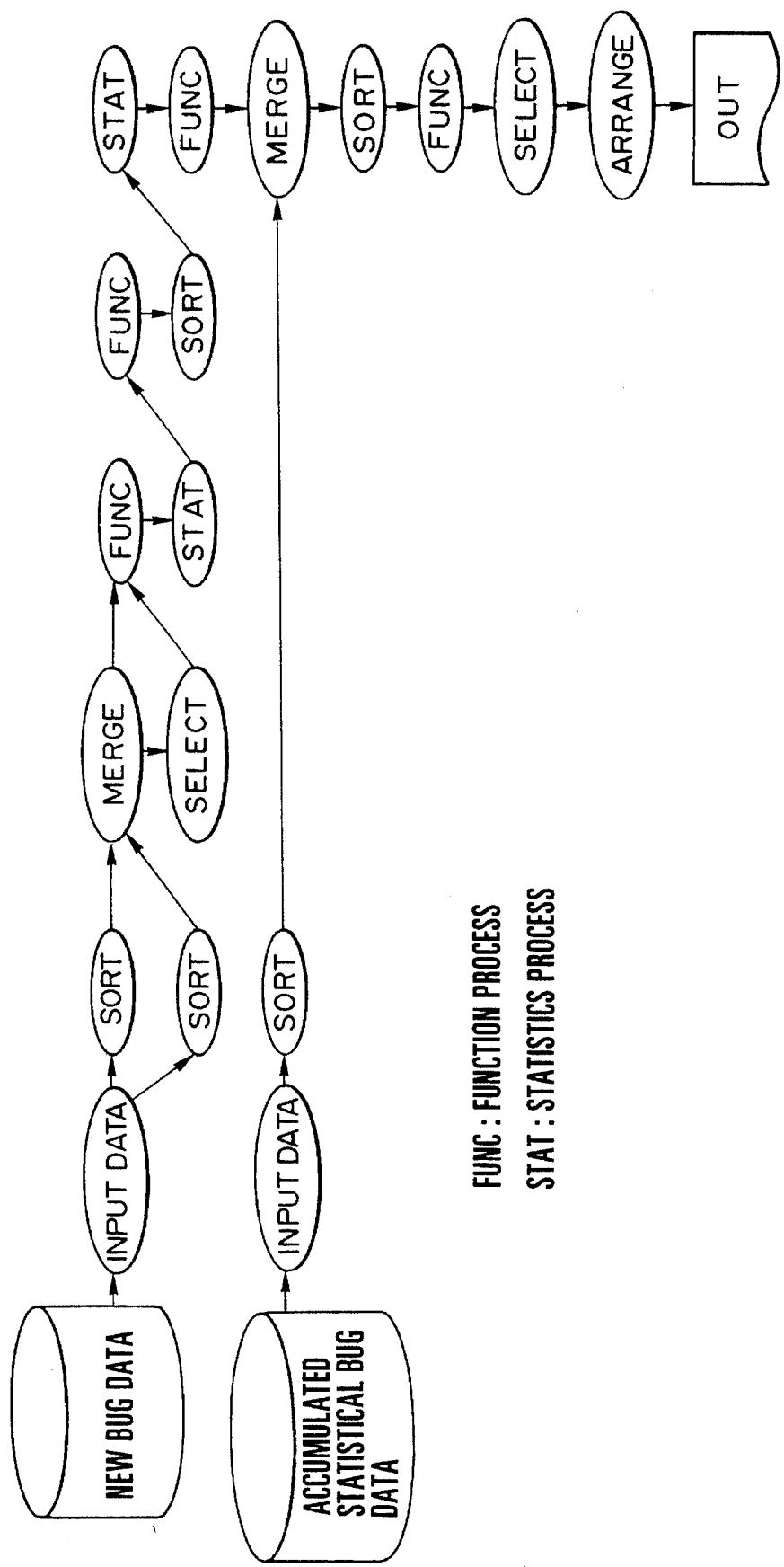
FIG. 15 is a schematic chart for illustrating, by way of example, database manipulation and report output processing according to another embodiment of the invention.

FIG. 15 shows an example of processing which is much complicated when compared with the preceding example. The processing shown in FIG. 15 is designed to process statistically the data of bugs upon every occurrence thereof, occurred newly, wherein the result of this processing is outputted as a report in combination with the statistical bug data in the past. The subprocessings each indicated as enclosed in an ellipse correspond to the methods, respectively. Accordingly, the processing which appears to be complicate can easily be realized by arraying the methods as indicated by arrows, adding the input/output/condition files to the methods, respectively, and describing them in a procedure file.

Since the processing can be segregated into the parts and the files, modifications of the processing once created can easily be coped with.

In general, in the database, alternation or modification of the data attributes is often required. By way of example, let's assume that the attribute "length" of the data concerning the date of debugging in the database 1 in the case of the example shown in FIG. 1 must be extended from six digits to eight digits. In this case, it is sufficient only to alter the length of the data concerning the debugging date from six digits to eight digits in the dictionary DICT1. Since the attribute of the debugging date is transferred to the methods M2 and M3 as well via the intermediate files IF1 and IF2 shown in FIG. 1 as the format field information, the methods M1, M2 and M3 can operate correctly even when the attribute data concerning the date of debugging is changed.

It is also possible to alter or modify the condition for a given method upon execution thereof through a conversational or dialogue process from the input device. This processing will be described in conjunction with the conditions shown in FIG. 9.

Figure 16:
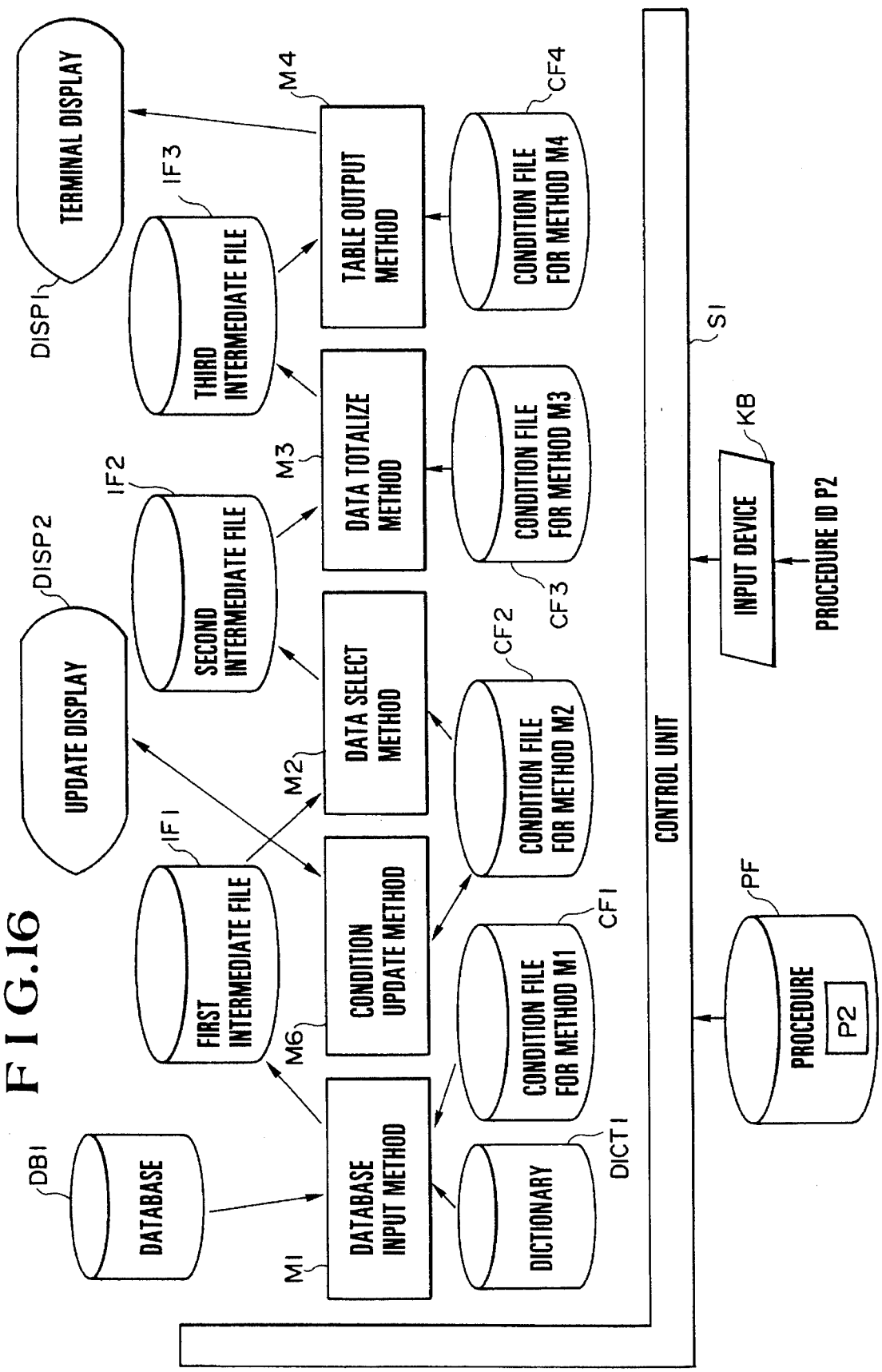
FIG. 16 is a schematic block diagram showing a general arrangement of a database manipulating/report issuing system according to a further embodiment of the invention.

The system configuration shown in FIG. 1 is extended to a system configuration shown in FIG. 16. With this system configuration, a condition update method M6 for updating the content of the condition file CF2 which is given to the method M2 from the terminal display DISP2 is added to alter the condition for the data select processing performed by the method M2, i.e., the condition for selecting the date of debugging. FIG. 17 shows contents of the processing to this end. As can be seen in this figure, it is possible to alter the condition for selecting the debugging date by correspondingly modifying the content of the condition file CF2 which stores the detailed processing information to be given to the data processing method M2 on a terminal display DISP2.

As other exemplary modifications of the system configuration, the following have to be mentioned, although the invention is never restricted thereto.

The database and the intermediate files may be secured on the main memory. In that case, the processing performance can be enhanced although limitation is imposed on the size of the file.

The methods may be prepared either as discrete programs, respectively, or as a single program having a plurality of entries.

The dictionary may be stored in the main memory.

The procedure file and the condition files may be prepared on the hard disk or on a memory. Further, these files may be inputted through a conversational process or transaction through the medium of the input device upon execution of the procedure.

The control unit may be realized as a program serving as an interpreter or implemented by utilizing a command analyzer "shell" commercially available from UNIX.

Figure 18:
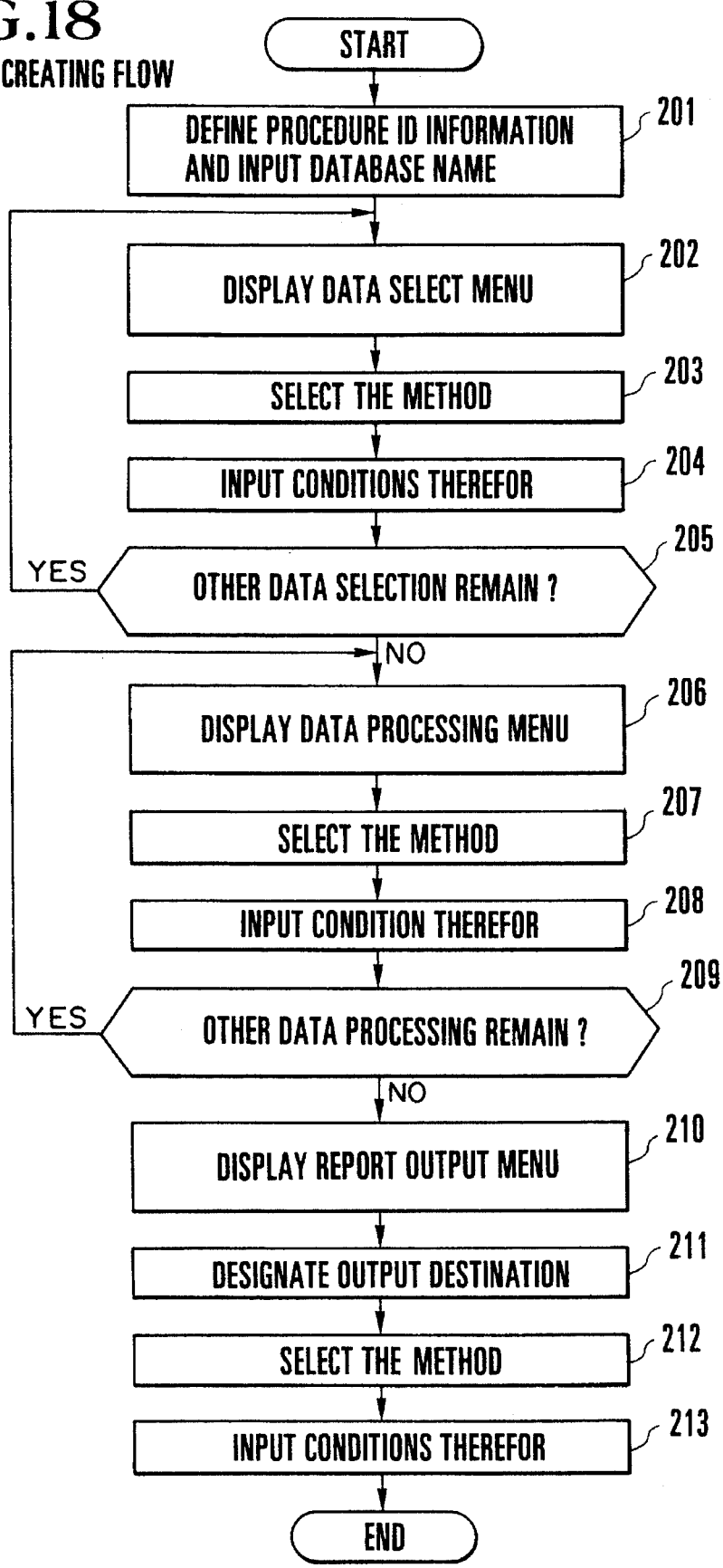
FIG. 18 is a flow chart illustrating a processing for generating a procedure file with the aid of a procedure file generating tool according to a further embodiment of the invention.

The system supplies the methods as software parts. In this conjunction, it is also possible to supply a tool for creating or preparing the procedure file. FIG. 18 shows, by way of example, preparation of a procedure file by using a tool. Upon activation, the tool generates a message on the terminal display to prompt the user to define the name of a procedure (procedure ID information) to be created and to input the name of a database of concern in a step 201. Subsequently, a list of the methods for selecting data to be processed from the database is displayed in the form of a menu on the terminal display device in a step 203. The user selects the relevant methods from the menu and input them in a step 203. Next, the formats of conditions corresponding to the selected methods are displayed by the tool to thereby allow the user to input the relevant conditions in a step 204. When further selection of data is required (i.e., when the result of the decision step 205 is affirmative "YES"), execution of the processing steps 202 to 204 is repeated. On the other hand, when the data as selected is to be processed (i.e., when the decision step 205 results in negation "No"), a menu for data selection is displayed by the tool in a step 206, whereby the user can input the relevant methods and conditions (steps 207 and 208). Similar processing steps are executed in the report output process (steps 210 to 213). In this manner, the tool creates the procedure file in accordance with the information as inputted. The intermediate input/output files used internally of the system are automatically defined and recorded in the procedure file by the tool. Thus, generation or creation of the procedure file can be much simplified and facilitated by making available the tool described above.

As is apparent from the foregoing, manipulation of the database and generation of a corresponding report can easily be carried by assembling the software parts referred to as the methods. Besides, partial modification as well as reuse of existing parts and files can be facilitated. Furthermore, the system according to the invention is compatible with a variety of data input forms such as data input from a display in a line mode or full-screen mode, data input from a database or other system as well as a variety of report output destinations such as terminal display device, printer, database, other processor system and the like.

What is claimed is:

1. In a computer system equipped with a database, a method for manipulating said database and issuing a report, the method comprising the steps of:

providing a plurality of methods, each method performing a single data manipulation of data in said database;

selecting one of said methods and input conditions for imposing limitation to the processing of said selected method and input/output file names as required;

repeating said selecting step for a number of times required for the processing;

generating and storing a procedure file defining a sequence of methods and relations among the methods, the conditions imposed into the methods and the input/output file names on the basis of the methods, conditions and the input/output file names as inputted by the user;

activating said methods in response to said procedure file identification information in the sequence defined in said procedure to thereby execute the respective processings;

issuing said report;

redefining at least one of (i) one or more of the methods and (ii) the sequence of methods and relations among the methods;

generating and storing a second procedure file defining the redefined sequence of methods and relations among the methods;

activating said redefined methods in response to said second procedure file identification information in the redefined sequence defined in said second procedure to thereby execute different respective processings; and issuing another report.

2. In a computer system equipped with a database, a method for manipulating said database and issuing an output report, the method comprising the steps of:

providing a plurality of methods, each method performing a single data manipulation of data in said database;

storing a sequence of said plurality of methods as a procedure in a procedure file;

executing said methods in the sequence defined in said procedure in response to identification information of said procedure;

issuing said output report;

redefining at least one of (i) one or more of the methods and (ii) the sequence of the methods;

executing the redefined sequence of methods to perform a different processing procedure on stored data; and issuing another output report.

3. A method according to claim 2, further comprising:

a step of storing conditions for imposing limitations to the processings of said methods, respectively;

wherein in said procedure storing step, correspondences between said methods and said conditions are stored additionally; and wherein in said method executing step, said methods are executed in accordance with the corresponding condition, respectively.

4. A method according to claim 3, wherein in said procedure storing step, input and output files for said methods are defined, and wherein upon execution of processing by said methods, said defined input/output files are used.

5. A database system, comprising:

a database for storing sets of data;

a dictionary means for storing definitions of at least one of identifiers, types, and lengths of individual items in said database;

a method storing means for storing a plurality of methods for executing processings related to said data, the method storing means connected with the dictionary means for selectively loading the stored definitions into the methods to change the processings executed thereby;

a procedure file describing a sequence (order) in which said methods are to be executed; and control means activated in response to file identification information of said procedure file to read said procedure file for thereby activating said methods in the sequence in which said methods are described and for issuing an output report.

6. A system according to claim 1, further comprising:

condition files for storing conditions limiting the processings executed by said methods, respectively; and intermediate files serving as output/input files for said methods to store intermediate results of the data processings;

wherein the condition files, the input files and the output files corresponding to said methods, respectively, are defined in said procedure file.

7. A system according to claim 6, wherein said intermediate files are stored in a hard disk system.

8. A system according to claim 6, wherein said intermediate files exist in a main memory.

9. A system according to claim 6, wherein said condition file is allocated to an input device so that said condition is inputted from said input device upon execution of said method.

10. A system according to claim 6, further comprising:

procedure generating means for displaying a list of said methods and formats of said conditions accompanying said methods on a display unit and generating a procedure file in accordance with the method and the condition therefor inputted from an input device.

11. A system according to claim 6, wherein means for storing said methods, said condition file and said intermediate file are separated from one another.

* * * * *

UNITED STATES PATENT AND TRADEMARK OFFICE
CERTIFICATE OF CORRECTION

PATENT NO. : 5,553,278
DATED : September 3, 1996
INVENTOR(S) : Hiroyuki Suzuki, et al.

It is certified that error appears in the above-indentified patent and that said Letters Patent is hereby corrected as shown below:

Claim 6, column 10, line 3, delete "claim 1" and insert therefor --claim 5--.

Signed and Sealed this

Twenty-sixth Day of November 1996

Attest:

BRUCE LEHMAN

Attesting Officer     Commissioner of Patents and Trademarks